United States Patent
Deokule et al.

(10) Patent No.: US 11,966,754 B2
(45) Date of Patent: *Apr. 23, 2024

(54) CLUSTER BOOTSTRAPPING FOR DISTRIBUTED COMPUTING SYSTEMS

(71) Applicant: Oracle International Corporation, Redwood Shores, CA (US)

(72) Inventors: Sameer Suhas Deokule, Fremont, CA (US); Aneesh Malkhed, Bangalore (IN); Sounak Chakraborty, Bangalore (IN); Devarajulu Kavali, Santa Clara, CA (US); Devaraj Das, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/869,666

(22) Filed: Jul. 20, 2022

(65) Prior Publication Data

US 2022/0357958 A1 Nov. 10, 2022

Related U.S. Application Data

(63) Continuation of application No. 17/230,854, filed on Apr. 14, 2021, now Pat. No. 11,429,397.

(51) Int. Cl.
*G06F 9/4401* (2018.01)
*G06F 16/2455* (2019.01)
*H04L 67/10* (2022.01)

(52) U.S. Cl.
CPC ...... *G06F 9/4416* (2013.01); *G06F 16/24552* (2019.01); *H04L 67/10* (2013.01)

(58) Field of Classification Search
CPC ... H04L 67/10; G06F 9/4416; G06F 16/24552
(Continued)

(56) References Cited

U.S. PATENT DOCUMENTS 9,355,109 B2  5/2016  Archak et al.
10,515,009 B1 12/2019  Wallace
(Continued)

FOREIGN PATENT DOCUMENTS

WO   2019085769 A1   5/2019

OTHER PUBLICATIONS

"Achieving 10x Acceleration of Spark and Hive Jobs on AWS S3 with Alluxio Tiered Storage", Alluxio, Available Online at: https://media.bitpipe.com/io_15x/io_151713/item_2149569/Whitepaper-Achieving-10x-acceleration-of-spark-and-hive-jobs-on-aws-s3-with-alluxio-tiered-storage.pdf, 13 pages.
(Continued)

*Primary Examiner* — Wing F Chan
*Assistant Examiner* — Leon Y Tseng
(74) *Attorney, Agent, or Firm* — Kilpatrick Townsend & Stockton LLP

(57) ABSTRACT

A distributed computing system is described that leverages a nearline storage layer to minimize the downtime required for bootstrapping a new computing cluster in the distributed computing system. The system executes a computing cluster comprising a set of computing nodes and determines a set of one or more data segments to be written to a nearline storage system. The system writes the data segments to the nearline storage system. In certain examples, the system receives a request to create a second computing cluster and responsive to the request, bootstraps the second computing cluster using the set of data segments stored on the nearline storage system. The system additionally leverages the nearline stor-
(Continued)

age layer to accelerate query processing by the computing nodes of a computing cluster.

16 Claims, 10 Drawing Sheets

(58) Field of Classification Search
USPC .................................................... 713/2
See application file for complete search history.

(56) References Cited

U.S. PATENT DOCUMENTS

| | | | |
|---|---|---|---|
| 10,642,800 B2 | 5/2020 | Gummaraju et al. | |
| 10,678,788 B2 | 6/2020 | Macnicol et al. | |
| 2010/0199036 A1 | 8/2010 | Siewert et al. | |
| 2014/0032595 A1 | 1/2014 | Makkar et al. | |
| 2014/0325151 A1 | 10/2014 | Kim et al. | |
| 2016/0085561 A1* | 3/2016 | Starsinic | H04W 4/70 713/2 |
| 2020/0106862 A1* | 4/2020 | Chugtu | H04L 41/0806 |

OTHER PUBLICATIONS

"Ehcache Tiering Options", Available Online at: https://www.ehcache.org/documentation/3.3/tiering.html, Accessed from internet on Dec. 1, 2020, 11 pages.

"Nearline Storage", Wikipedia.com, Available online at: https://en.wikipedia.org/wiki/Nearline_storage#, Retrieved online on Jun. 3, 2022, 3 pages.

U.S. Appl. No. 17/230,854, Notice of Allowance dated May 31, 2022, 10 pages.

Bayati et al., "Exploring Benefits of NVMe SSDs for BigData Processing in Enterprise Data Centers", 2019 5th International Conference on Big Data Computing and Communications (BIGCOM), Available Online at: https://www.researchgate.net/publication/337501121_Exploring_Benefits_of_NVMe_SSDs_for_BigData_Processing_in_Enterprise_Data_Centers, Aug. 2019, pp. 98-106.

Hirchfeld et al., "Bootstrapping Open Source Clouds", dell.com, Available online at: https://i.dell.com/sites/doccontent/business/solutions/whitepapers/en/Documents/bootstrapping-openstack-clouds.pdf, Dec. 2011, 16 pages.

Kougkas et al., "I/O Acceleration via Multi-Tiered Data Buffering and Prefetching", Journal of Computer Science and Technology, Available Online at: http://www.cs.iit.edu/~scs/assets/files/hermes_JCST.pdf, 2019, 33 pages.

Morgan, "Why the Coldest Storage at Google is Nearline", nextplatform.com, Available online at: https://www.nextplatform.com/2015/03/16/why-the-coldest-storage-at-google-is-nearline/, Mar. 16, 2015, 10 pages.

Pearson, "The Correct Use of the term Nearline", ibm.com, Available online at: https://www.ibm.com/support/pages/correct-use-term-nearline, Retrieved online on Jun. 3, 2022, 2 pages.

Tang et al., "A Survey on Spark Ecosystem for Big Data Processing", Available Online at: https://arxiv.org/pdf/1811.08834.pdf, Nov. 18, 2018, 21 pages.

* cited by examiner

CLUSTER BOOTSTRAPPING FOR DISTRIBUTED COMPUTING SYSTEMS

CROSS-REFERENCE TO RELATED APPLICATION

The present application is a continuation of, and claims the benefit of and priority to, U.S. patent application Ser. No. 17/230,854 filed on Apr. 14, 2021, the entire contents of which are incorporated herein by reference for all purposes.

BACKGROUND

Cloud-based data processing services provide a fast and reliable solution for managing and processing large volumes of raw data for any suitable number of tenants. A cloud-based data processing service may be implemented using a distributed computing system that includes any suitable number of computing clusters of connected nodes (e.g., computers, servers, virtual machines, etc.) that perform operations in a coordinated manner to handle various requests by tenants of the distributed computing system. For high performance, computing clusters within distributed computing systems need to have high availability and be able to run reliably with minimal downtime. Existing architectures implementing distributed computing systems need to be improved to ensure the increased and continuous availability of computing clusters in distributed computing systems.

BRIEF SUMMARY

The present disclosure relates generally to distributed computing systems. More specifically, but not by way of limitation, an improved architecture for a distributed computing system is described that leverages a nearline storage layer to minimize the downtime required for bootstrapping a computing cluster within the distributed computing system and to accelerate query processing within the computing cluster.

In certain embodiments, a distributed computing system is disclosed. The distributed computing system provides a data processing service and executes a first computing cluster comprising a first set of computing nodes. The system determines a set of one or more data segments to be written to a nearline storage system associated with the distributed computing system and based on the determining, writes the set of one or more data segments to the nearline storage system. The system receives a request to create a second computing cluster in the distributed computing system. The second computing cluster comprises a second set of one or more computing nodes. Responsive to the request, the system bootstraps the second computing cluster using the set of one or more data segments stored on the nearline storage system.

In certain examples, the request to create the second computing cluster is received responsive to at least one of a cluster upgrade, a cluster migration, or a cluster failover associated with the first computing cluster.

In certain examples, bootstrapping the second computing cluster comprises obtaining, by one or more computing nodes in the second set of computing nodes in the second computing cluster, the set of data segments stored in the nearline storage system and pre-populating, by the computing nodes, a cache associated with the computing nodes with the set of data segments.

In certain examples, the nearline storage system represents an intermediary storage layer between the cache associated with the one or more computing nodes and an object storage system associated with the cloud computing system.

In certain examples, a computing node in the first set of computing nodes in the first computing cluster receives a query for execution and determines that one or more data segments for executing the query are present in a cache associated with the computing node. The computing node then executes the query using the one or more data segments, obtains one or more updated data segments as a result of executing the query and writes the updated data segments to the nearline storage system.

In certain examples, a computing node in the first set of computing nodes in the first computing cluster receives a query for execution and determines that one or more data segments for executing the query are not present in a cache associated with the computing node. Responsive to determining that the data segments are not present in the cache, the computing node obtains the data segments from an object storage system associated with the distributed computing system and writes the data segments to the nearline storage system.

In certain examples, a computing node in the first set of computing nodes in the first computing cluster identifies data segments stored in a cache of the computing node, selects a subset of the data segments and writes the selected subset of data segments to the nearline storage system. In certain examples, the selecting is performed using a selection technique such as a least recently used (LRU) selection technique or a least frequently used (LFU) selection technique.

In certain examples, a computing node in the first set of computing nodes is associated with a cache. The cache comprises a set of one or more cache memory tiers. The set of one or more cache memory tiers comprise an object storage cache tier and a nearline storage cache tier. In certain examples, the object storage cache tier is mapped to an object storage system associated with the distributed computing system. The object storage cache tier is configured to temporarily store data segments for the object storage system. In certain examples, the nearline storage cache tier is mapped to the nearline storage system associated with the distributed computing system. The nearline storage cache tier is configured to temporarily store data segments for the nearline storage system.

In certain examples, a computing node in the first set of computing nodes in the first computing cluster writes a set of one or more data segments to a nearline storage cache tier associated with the computing node. In certain examples, the nearline storage cache tier is configured to temporarily store the set of data segments for the nearline storage system.

In certain examples, the first computing cluster and the second computing cluster are associated with a first tenant of the distributed computing system.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
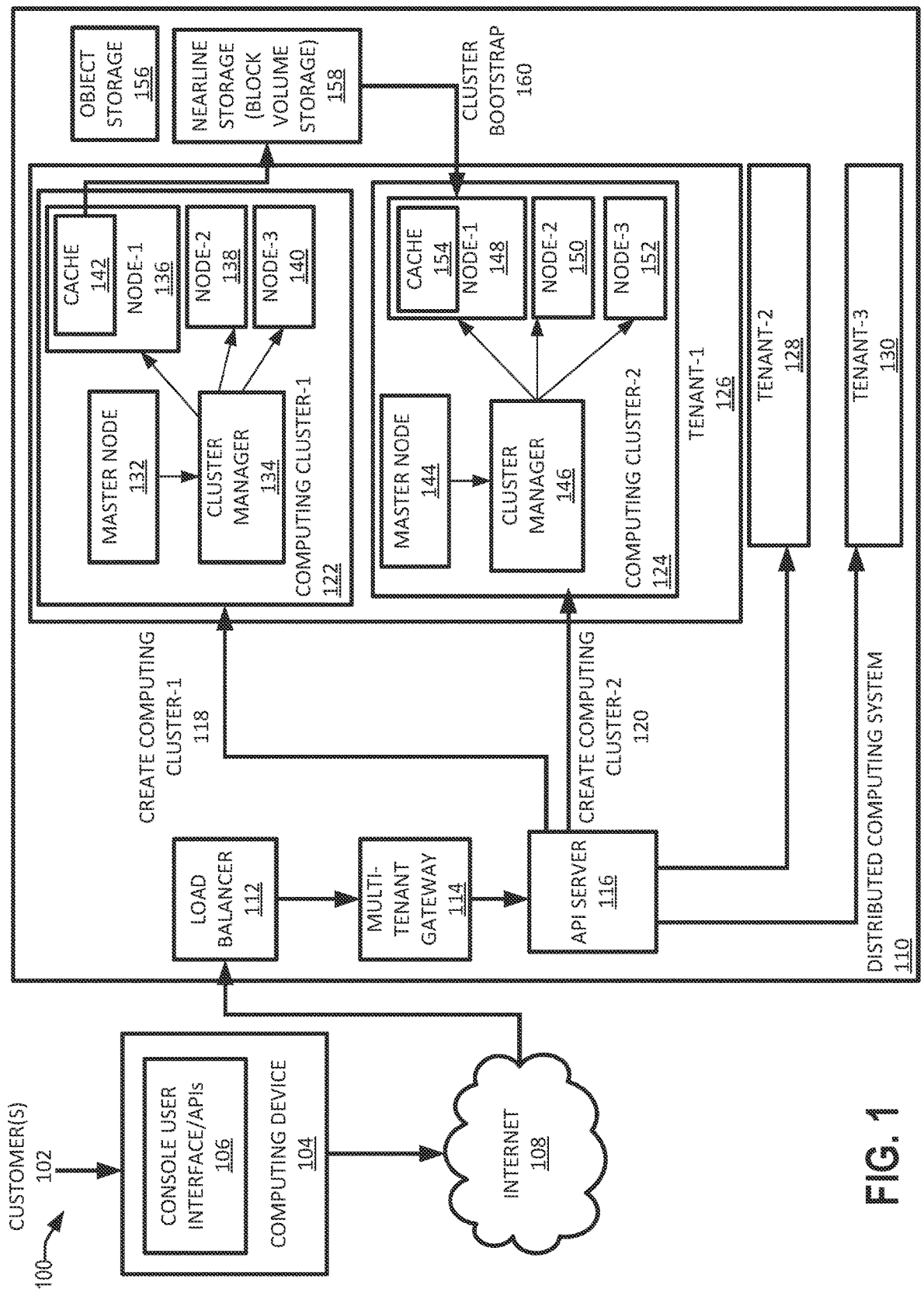
FIG. 1 depicts a distributed computing system in a cloud computing environment that includes improved capabilities for bootstrapping a target computing cluster within the distributed computing system using a nearline storage system, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to distributed computing systems. More specifically, but not by way of limitation, an improved architecture for a distributed computing system is described that leverages a nearline storage layer to minimize the downtime required for bootstrapping a computing cluster within the distributed computing system and to accelerate query processing within the computing cluster.

Distributed computing systems have become increasingly common. A distributed computing system may be provided in a cloud computing environment that includes capabilities for providing a fast and reliable solution for managing and processing large volumes of raw data for different customers or tenants of the cloud computing environment. A distributed computing system may include a computing cluster of connected nodes (e.g., computers, servers, virtual machines, etc.) that work together in a coordinated fashion to handle various requests (e.g., request to store and/or retrieve data in a system that maintains a database) by any suitable number of tenants. A "computing instance" (also referred to as a "computing node") may include a server, a computing device, a virtual machine, or any suitable physical or virtual computing resource configured to perform operations as part of a computing cluster.

To provide increased and continuous availability, a distributed computing system may be configured with failover capabilities so that when a computing node in a cluster fails, other nodes in the cluster can continue to provide data services, and the failed node's workload can be spread across the remaining nodes of the cluster. In certain situations, high availability may further be achieved in a distributed computing system by using a secondary cluster that can serve as a "failover cluster" when a primary cluster encounters performance issues that result in a cluster-wide crash. Other situations when a failover cluster may need to be launched are when immediate security patches have to be performed on a primary cluster, upgraded versions of the primary cluster need to immediately be made available to its users and so on.

Launching a new/target computing cluster in a distributed computing system typically involves performing a bootstrapping process to get the nodes of the cluster up and running. The bootstrapping process is traditionally a manual process that involves the acquisition of configuration data for one or more resources of the new cluster by a computing node to be added to the new cluster of the computing environment. Bootstrapping may additionally involve processing performed by the computing nodes to obtain data required to pre-populate their cache on the new cluster. The data is usually obtained by probing, by the computing nodes, for the data from an underlying, slower, deep storage layer (e.g., an object storage system) that is typically used by the distributed computing system for offline storage and/or archiving of data. Probing for data from such a deep storage layer can considerably increase data retrieval times for the computing nodes of the new cluster and degrade system performance.

The distributed computing system described in the present disclosure provides several technical advancements and/or improvements over conventional distributed computing systems provided by cloud-based data processing services. The distributed computing system described in this disclosure provides a new and improved architecture that leverages a nearline storage layer to minimize the downtime required for bootstrapping a new computing cluster in the distributed computing system. A "nearline storage system" may represent an intermediate type of data storage system that represents a compromise between online storage that supports frequent, very rapid access to data (e.g., cache memory (DRAM) or RAM attached to a computing node) and offline storage (e.g., an object storage system that supports infrequent access to data and used for offline storage/archiving of data).

Using a nearline storage system to bootstrap (i.e., prepopulate) a cache associated with computing nodes of a new/target computing cluster reduces cache warming times for the target/new cluster that is being provisioned as part of a cluster upgrade, cluster migration, or cluster failover in the distributed computing system. Cache warming times are reduced because the computing nodes of the target cluster can build their cache by probing an intermediate nearline storage layer for the presence of cached data instead of having to fetch the data from a slower and more expensive object storage system. In certain embodiments, the new and improved architecture provided by the distributed computing system additionally includes capabilities to accelerate query processing within a computing cluster by enabling the computing nodes within the cluster to write data obtained as a result of data processing and query execution to the nearline storage layer. As data in the cache of the computing nodes undergo churn and eviction, the computing nodes can probe the nearline storage layer for data availability prior to fetching the data from object storage, thereby optimizing and/or accelerating query processing and query execution against data of any size processed by the distributed computing system.

FIG. 1 depicts a distributed computing system in a cloud computing environment 100 that includes improved capabilities for bootstrapping a target computing cluster within the distributed computing system using a nearline storage system, according to certain embodiments. The distributed computing system 110 may be implemented by one or more computing systems that execute computer-readable instructions (e.g., code, program) to implement the distributed computing system. As depicted in FIG. 1, the distributed computing system 110 includes various systems including a load balancer 112, a multi-tenant gateway 114, an Application Programming Interface (API) server 116, and a set of one or more computing clusters 122 and 124. Portions of data or information used by or generated by the systems shown in FIG. 1 may be stored on one or more of the storage systems 156 and 158. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 110 may be implemented in various different configurations. In the embodiment shown in FIG. 1, the distributed computing system 110 may be implemented on one or more servers of a cloud provider network and its data processing and data analytics services may be provided to subscribers of cloud services on a subscription basis. The computing environment 100 comprising the distributed computing system 110 depicted in FIG. 1 is merely an example and is not intended to unduly limit the scope of claimed embodiments. One of ordinary skill in the art would recognize many possible variations, alternatives, and modifications. For example, in some implementations, the distributed computing system 110 can be implemented using more or fewer systems than those shown in FIG. 1, may combine two or more systems, or may have a different configuration or arrangement of systems.

In certain embodiments, a computing cluster (e.g., 122 or 124) may represent a distributed computing engine for processing and analyzing large amounts of data for a tenant or customer of the distributed computing system 110. Different computing clusters may be associated with a tenant. For instance, in the embodiment shown in FIG. 1, the computing clusters 122 and 124 are associated with a first tenant, tenant-1 126 of the distributed computing system. One or more different computing clusters may be associated with a second tenant, tenant-2 128. Similarly, one or more computing clusters may be associated with a third tenant, tenant-3 130 of the cloud computing system 102. A computing cluster may be configured to perform operations in a coordinated fashion utilizing any suitable number of computing nodes. As previously noted, a "computing node" (also referred to herein as a "node") may include a server, a computing device, a virtual machine, or any suitable physical or virtual computing resource configured to perform operations as part of the computing cluster. By way of example, a computing cluster (e.g., 122) may include a master node 132 and one or more worker nodes 136, 138, and 140, both being examples of computing nodes. In some embodiments, the master node 132 performs any suitable operations related to task assignment corresponding to the worker nodes, such as load balancing, node provisioning, node removal, or any suitable operations corresponding to managing the computing cluster 122. A worker node (e.g., 136) is configured to perform operations corresponding to tasks assigned to it by a master node. As a non-limiting example, a worker node 136 can perform data storage and/or data retrieval tasks associated with a storage system/database at the behest of the master node 132 that assigns the worker node 136 a particular storage/retrieval task.

In certain examples, the master node (e.g., 132) in a computing cluster (e.g., 122) may be configured to execute a driver program (i.e., the process running an application that is built on the computing cluster) and may execute operations to create the application's context. An "application" may refer to a complete, executable driver program that is run as an independent process and coordinated by the application's context in the driver program executed in the master node. The application's context may connect to a cluster manager 134 which allocates system resources to all the nodes in the cluster. Each worker node (e.g., 136, 138, or 140) in the computing cluster 122 may be managed by one or more executors which may be processes (execution engines) launched on the worker nodes to perform operations corresponding to a task assigned to the node. The application code is sent from the driver program to the executors, and the executors specify the context and the various tasks to be run. The executors communicate back and forth with the driver program for data sharing or for interaction. The executors may additionally perform operations related to managing the computation as well as the storage and caching of data on the nodes. In a certain implementation, a computing cluster may be implemented using a distributed computing engine (e.g., Apache Spark) and the cluster manager 130 within a computing cluster may be implemented using a container orchestration platform such as Kubernetes.

In certain examples, portions of data or information used by or generated by the computing clusters shown in FIG. 1 may be stored on one or more storage systems 156, 158 of the distributed computing system 110. In the embodiment depicted in FIG. 1, the storage systems include an object storage system 156 and a block volume storage system 158. The object storage system 156 and block volume storage system 158 represent different storage tiers (or storage layers) for storing and caching data that is used, analyzed, and processed by the different computing clusters associated with the different tenants of the cloud computing system 110. By way of example, the object storage system 156 may represent a type of storage system that uses object-based storage to store data by managing and manipulating data as distinct units, referred to as objects. The object storage system 156 may be used for offline storage and/or archiving of data (e.g., used for backups or long-term storage, with infrequent access to data). The block volume storage system 158, sometimes referred to as block-level storage, may represent a type of storage system that stores data by breaking up data into blocks and then stores those blocks as separate pieces, each with a unique identifier. The block volume storage system 158 may represent a less expensive storage layer than in-memory and/or attached storage associated with a computing node but is more performant than the object storage system 156. In certain embodiments, the block volume storage system 148 may represent a nearline storage system for storing cached data that is generated based on data processing and query execution performed by the computing nodes of a computing cluster. A "nearline storage system" may represent an intermediate type of data storage system that represents a compromise between online storage that supports frequent, very rapid access to data (e.g., cache memory (DRAM) or RAM attached to a computing node) and offline storage (e.g., the object storage system 156 that supports infrequent access to data and used for offline storage/archiving of data.

In a certain implementation, the data processed by the computing clusters may be represented and stored in the storage systems 156 and 158 as "data cubes." A "data cube" may refer to a data structure that may be used to represent data along some measure of interest such as two-dimensional, three-dimensional, or a higher-dimensional representation. A data cube can store large amounts of data while also providing users with searchable access to any data points and can be queried to provide real-time results. In certain examples, at runtime, a computing cluster may cache "data cube" indices in part or in whole as one or more "data segments" in cache memory of the computing nodes that form a computing cluster or store the segments on attached secondary storage (e.g., Random Access Memory (RAM), Solid State Drives (SSD) or Hard Disk Drives (HDD)) associated with the computing nodes. As used herein a "data segment" may refer to an individual dimension of the data cube that can be filtered and analyzed to provide detailed results to a customer/tenant of the cloud computing system 110.

In certain approaches, the distributed computing system 110 may be configured to determine the placement of data segments on the various computing nodes that make up a computing cluster. The placement of data segments on specific computing nodes in a cluster enables faster retrieval of data segments when particular data segments have to read by the nodes of the computing cluster. Various approaches may be used by the distributed computing system 110 to determine the placement of data segments on the various computing nodes that make up a computing cluster. For instance, in one approach, the distributed computing system 110 may utilize a consistent hashing strategy to identify the computing node that will store a particular set of data segments. When a query is submitted by a user of the distributed computing system 110, a master node (e.g., 132) within a computing cluster (e.g., 122) may be configured to identify (e.g., using a consistent hashing strategy) the worker computing node (e.g., 136) that stores the data segments needed to execute the query and then transmits the query to the worker node for execution.

In certain embodiments, a user (e.g., a customer 102) may interact with the distributed computing system 110 via a computing device 104 that is communicatively coupled to the distributed computing system 110 possibly via a public network 108 (e.g., the Internet). The computing device may be of various types, including but not limited to, a mobile phone, a tablet, a desktop computer, and the like. A user may interact with the cloud computing system using a console user interface (UI) (which may be a graphical user interface (GUI)) of an application executed by the computing device or via Application Programming Interface (API) operations 106 provided by the distributed computing system 110. For instance, the user may interact with the distributed computing system 110 to create one or more computing clusters, run interactive queries against pre-existing data stored in the storage systems, and retrieve results as a result of the query processing.

As an example, a user associated with a first tenant, tenant-1 126 of the distributed computing system 110 may interact with the distributed computing system 110 by transmitting a request to the distributed computing system 110 to create one or more computing clusters. The create computing clyster request 118 may be received by a load balancer 112 in the distributed computing system 110 which may transmit the request to a multi-tenant proxy service (gateway) 114 within the distributed computing system. The multi-tenant proxy service (gateway) 114 may be responsible for authenticating/authorizing the user's request and routing the request to an API server 116 that may be configured to execute operations for creating the computing cluster. In certain examples, the multi-tenant gateway 114 may represent a shared multi-tenant Hyper Text Transfer Protocol (HTTP) proxy service that authorizes the user and submits the user's request to the API server 116 to enable the creation of a computing cluster for the tenant. In certain examples, and as previously described, the creation of a computing cluster may involve creating a pool of computing nodes comprising a master node and a set of worker nodes. One or more clusters may be created under a dedicated subnet for the tenant. Thus, the distributed computing system 110 includes capabilities for providing isolation between computing clusters that belong to different tenants.

In certain embodiments, the API server 116 may receive a second create computing cluster request 120 to create a new (second) computing cluster for a tenant (e.g., tenant-1 128). In certain examples, the second request 120 may be received in response to a cluster failover, cluster migration or cluster upgrade of a first computing cluster (e.g., 122) associated with the tenant. Responsive to the second request, the API server 116 may enable the creation of a second computing cluster 122 for the tenant. As depicted in FIG. 1, the second computing cluster 122 may comprise a master computing node 144, a pool of worker nodes, 148, 150 and 152 and a cluster manager 146 which allocates system resources to all the nodes in the cluster. After creating the computing cluster, the user may submit (via the UI or APIs 106) queries to the computing cluster. The computing cluster executes the queries against the data stored in the storage systems and provides results back to the user.

In certain aspects, in order to accelerate query processing and execution within the cluster, a computing cluster (e.g., 122) within the distributed computing system 110 may include capabilities to cache the data required for computation of queries in-memory (also referred to herein as "cache memory") in the different computing nodes of the cluster. For instance, the cache memory (e.g., 142) may represent a small amount of dynamic random access memory (DRAM) which is very fast and expensive, located close to the central processing unit of the computing node. In certain embodiments, the computing nodes within a computing cluster are provided with improved capabilities to perform the efficient processing and analysis of data within a computing cluster by writing the cached data (e.g., which may be represented as one or more data segments) corresponding to query execution to a nearline storage system (e.g., the block volume storage system 158). A new/target computing cluster (e.g., 124) that is required to be provisioned in the distributed computing system 110, for example, as a result of a cluster upgrade, cluster migration or a cluster failover of a primary computing cluster (e.g., 122) can thus leverage the nearline storage system to pre-populate/bootstrap the cache (e.g., 154) on its computing nodes instead of fetching the data from the object storage system. Using the nearline storage system to pre-populate a cache associated with computing nodes of a target cluster reduces cache warming times for the target cluster that is being provisioned as part of a cluster upgrade, cluster migration, or cluster failover. Additionally, by using a nearline storage system, query processing within the target computing cluster is accelerated because the computing nodes of the cluster can probe the intermediate nearline storage layer for cached segments instead of fetching the data from a slower and more expensive object storage system. Additional details of the operations performed by the computing nodes to write cached segments to the nearline storage system is described in detail in FIG. 2.

Figure 2:
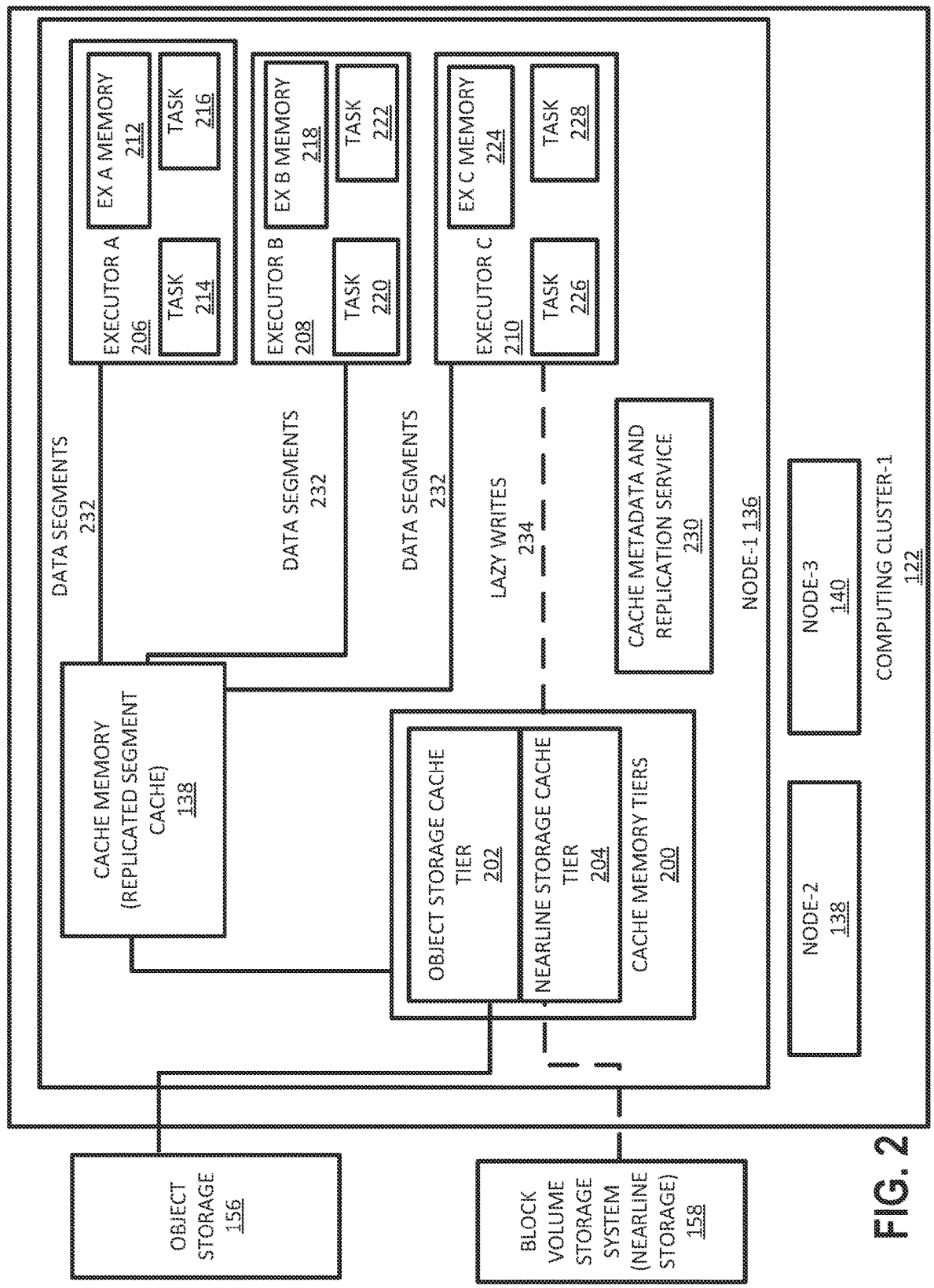
FIG. 2 illustrates the manner in which data stored on a computing node of a computing cluster shown in FIG. 1 is written to a nearline storage system associated with the computing cluster, according to certain embodiments.

FIG. 2 illustrates the manner in which data stored on a computing node of a computing cluster shown in FIG. 1 is written to a nearline storage system associated with the computing cluster, according to certain embodiments. The embodiment depicted in FIG. 2 illustrates a computing cluster, computing cluster-1 122 comprising a set of computing nodes 136, 138 and 140. A computing node (e.g., 136) within the computing cluster 122 may utilize any suitable number of executors (e.g., execution engines or processes) operating on the computing node that are configured to perform operations corresponding to one or more tasks, 214, 216, 220, 222, 226 and 228 assigned to the node. In the embodiment shown in FIG. 2, the computing node 136 utilizes three executors, executor A 206, executor B 208, and executor C 210. Each executor, 206, 208 and 210 may additionally comprise executor memory (e.g., 212, 218 and 224 respectively) which may be a portion of the cache memory 138 associated with the computing node 132 that is shared by each executor. Each executor may be configured to run tasks and write data (e.g., data segments) resulting from the execution of the tasks to the cache memory 138 of the computing node. The executors may be responsible for performing all the data processing for its node, interact with external sources to read and write data (i.e., data segments 232) to the external sources (e.g., the storage systems 156 and 158) and store the results of their computation in executor memory, in cache memory 138 or on secondary storage (e.g., RAM, SSD, HDD) associated with the computing node.

In certain embodiments, a computing node (e.g., 136) within the computing cluster 122 may implement a cache metadata and replication service 208. The cache metadata and replication service 208 includes capabilities to ensure that the data segments 232 being utilized by the computing node 136 for query execution are replicated across the other nodes (e.g., 138, 140) within the computing cluster 122. The replication of data segments across the other nodes ensures improved scalability and fault tolerance within the computing cluster 122. In certain examples, the cache memory 138 of the computing node may represent a replicated segment cache. A replicated segment cache may refer to a clustered, fault tolerant cache in a computing cluster where segments are fully replicated to all nodes within the cluster. By replicated segments to other nodes, a replicated segment cache includes capabilities to handle data replication, concurrency control, and failover in a cluster, and deliver in-memory data access speeds.

In certain aspects, the cache memory 138 within a computing node 136 may be implemented using a set of one or more cache memory tiers 200. Each cache tier may be designed to speed up access to data segments stored on a corresponding storage tier and each cache tier may be configured to provide different storage levels to persist/cache segments for a particular storage tier (storage system) that is mapped to the cache tier. For instance, in one implementation, a first cache tier (e.g., an object storage cache tier 202) may be mapped to a backing pool of slower and cheaper devices (i.e., object storage system 156) and this cache tier may be configured to temporarily cache/persist segments for the object storage system. A second cache tier (e.g., a nearline storage cache tier 204) may be mapped to a scale out block volume storage system 158 that is cheaper than in-memory (i.e. cache memory) and/or secondary storage (e.g., RAM, SSD, or HDD) attached to the computing node but more performant and expensive than the object storage system. In certain embodiments, the nearline storage cache tier 204 may be configured to temporarily store a working set of data segments that are being actively used by the computing node for query processing. These data segments may include, for instance, the most recently updated segments, the most frequently accessed segments and so on. The object storage cache tier 202 may be configured to temporarily store a subset of data segments that are not so frequently used by or accessed by the computing node.

In certain embodiments, the computing node 132 may be configured with new and improved capabilities to perform efficient data processing and execution of queries within its computing cluster by writing data (i.e., data segments 232) being processed by the computing node to a nearline storage system (e.g., the block volume storage system 148). The movement of segments to the nearline storage system may be performed in a variety of situations by a computing node. For instance, in addition to replicating segments across the other nodes of the cluster, the cache metadata and replication service 230 may be responsible for identifying data segments that have already been fetched into the local cache (cache memory 138) of the computing node during query execution and selects a subset of these segments as candidate segments to be moved to the nearline storage cache tier 204. These subset of segments may comprise segments that are being actively used by the computing node such as the most recently updated segments, the most frequently accessed segments and so on. Since the nearline storage cache tier 204 is configured to store a representative working set of segments actively being used by the computing node, as part of ongoing bookkeeping in the computing cluster, the cache metadata and replication service 230 may additionally periodically update the state of the cache in the nearline storage cache tier 204 so that it is aligned with the complete set of segments stored on the object storage system. When the nearline storage cache tier 204 becomes full, the cache metadata and replication service 230 may be configured to move some of the cached data segments to its corresponding backing storage tier, which is the nearline storage system 158. As segments in nearline storage cache tier 204 undergo churn and eviction, the computing node may probe the nearline storage system 158 for segment availability prior to fetching the data segments from object storage. Thus, by writing segments to the nearline storage system 158, query processing times by the computing nodes of a computing cluster can be accelerated.

In certain examples, the cache metadata and replication service 230 may be configured to identify new segments that have been downloaded by the computing node to its cache memory for the first time from the object storage system. For instance, new segments may be downloaded from the object storage system when a user triggers a query for the first time. In this case, the cache metadata and replication service 230 may identify a subset of these segments for movement to the nearline storage cache tier 204 which may then be moved to the nearline storage system 158.

In certain examples, the movement of data segments to the nearline storage system 158 may be performed by executors within the computing node 136 during query execution. For instance, as part of query execution, the executors 206, 208, or 210 within computing node 136 may be configured to lazily write/move data segments to the nearline storage cache tier 204. The segments may, for example, correspond to updated data segments generated as a result of evaluating a query. Lazy evaluation may be performed by the executors when transformations occur within an application. As used herein, a "transformation" may refer to a function that produces updated data segments from existing data segments that are being evaluated by the query. In lazy evaluation, data segments are not loaded by the executors (in executor memory) until it is necessary. In addition to writing updated data segments, the executors may also be configured to write partial query results generated by the query or the results for an entire query to the nearline storage cache tier 204. These segments and query results may then be moved to the nearline storage system 158.

A new/target computing cluster (e.g., 124) shown in FIG. 1 that is required to be provisioned in the distributed computing system 110, for example, as a result of a cluster upgrade, cluster migration or a cluster failover of a primary computing cluster (e.g., 122) can thus leverage the nearline storage system to pre-populate/bootstrap the cache (e.g., 154) on its computing nodes instead of fetching the data from the object storage system. Using the nearline storage system to pre-populate a cache associated with the computing nodes of a target cluster reduces cache warming times for the target cluster that is being provisioned and minimizes the downtime required for bootstrapping the target cluster.

Figure 3:
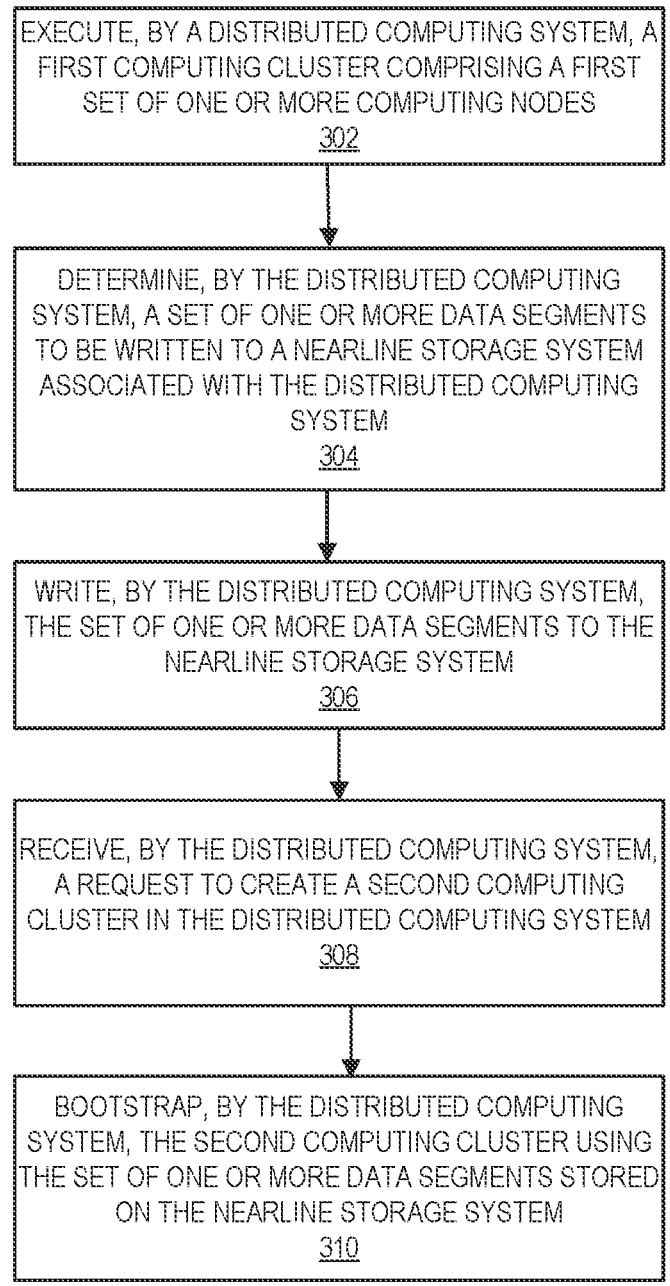
FIG. 3 depicts an example of operations performed by a computing node in a computing cluster of the distributed computing system shown in FIG. 1, according to certain embodiments.

FIG. 3 depicts an example of operations performed by a computing node in a computing cluster of the distributed computing system shown in FIG. 1, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by components of the distributed computing system 110, such as by a computing node 136 comprised in a first computing cluster 122 of the distributed computing system 110.

The processing depicted in FIG. 3 assumes that data segments have been placed in various computing nodes of the first computing cluster within the distributed computing system according to a placement strategy used by the distributed computing system. For instance, the distributed computing system may use a consistent hashing strategy to determine the placement of data segments in the various computing nodes of the computing cluster. For example, in the embodiment depicted in FIG. 1, the distributed computing system 110 may receive a query for execution from a user (e.g., 102). Within the distributed computing system 110, the load balancer 122 may receive the query request and transmit the query to the multi-tenant gateway 114 that authenticates the user's request and then routes the request to the API server 116. The API server 116 identifies the computing cluster (e.g., 122) that is responsible for handling the query request and transmits the request to the identified computing cluster. A master node (e.g., 132) in the computing cluster then identifies the worker computing node (e.g., 136) that stores the data segments needed to execute the query and transmits the query to the worker node for execution.

The processing depicted in FIG. 3 may be initiated when, at block 302, the distributed computing system executes a computing cluster (e.g., a first computing cluster 122) comprising a first set of computing nodes 136, 138 and 140. At block 304, the distributed computing system determines a set of one or more data segments to be written to a nearline storage system associated with the distributed computing system. For example, in the embodiment depicted in FIG. 1, a worker computing node (e.g., 136) in a computing cluster (e.g., 122) in the distributed computing system 110 may perform the processing in block 302 to determine set of one or more data segments to be written to the nearline storage system. The computing node may utilize various approaches to determine the set of one or more data segments to be written to the nearline storage system. Additional details of the different approaches used by the computing node to determine the data segments to be written to the nearline storage system are described in FIG. 4 and FIG. 5.

At block 306, the distributed computing system writes the set of one or more data segments to the nearline storage system. For example, in FIG. 1, the worker computing node (e.g., 136) in a computing cluster (e.g., 122) in the distributed computing system 110 may write the set of one or more data segments to the nearline storage system 158. In certain examples, as previously described, the data segments may be written to the nearline storage cache tier 204 (shown in FIG. 2) prior to being written to the nearline storage system 158.

At block 308, the distributed computing system may receive a request to create a second computing cluster in the distributed computing system. For example, in FIG. 1, the API server 116 may receive a "create computing cluster" request 120 to create a new (second) computing cluster for a tenant (e.g., tenant-1 128). As previously described, the second request 120 may be received in response to a cluster failover, cluster migration or cluster upgrade of a first computing cluster (e.g., 122) associated with the tenant. Responsive to the second request, the API server 116 may enable the creation of a second computing cluster 122 for the tenant.

At block 310, responsive to the request received in block 308, the distributed computing system bootstraps the second computing cluster using the set of one or more data segments stored on the nearline storage system. For example, in FIG. 1, a computing node 148 within the computing cluster 124 may perform the processing in block 308 to pre-populate/bootstrap the cache (e.g., 154) on its node using the one or more data segments stored on the nearline storage system. As previously described, by using the nearline storage system to pre-populate a cache associated with computing nodes of a target cluster, cache warming times for the second computing cluster that is being provisioned are reduced and the downtime required for bootstrapping the second computing cluster is minimized.

Figure 4:
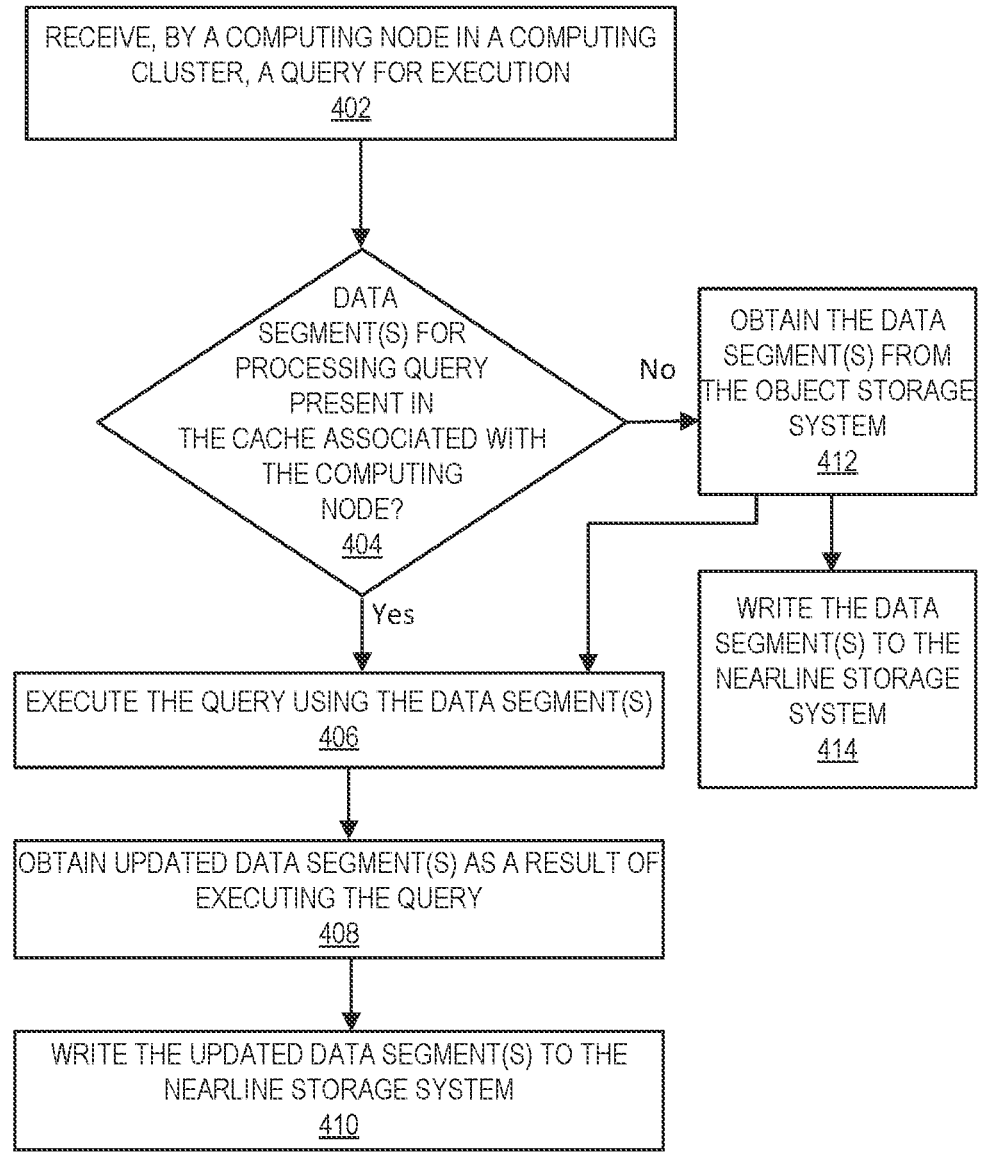
FIG. 4 depicts an example of a process performed by a computing node in a computing cluster of the distributed computing system shown in FIG. 1 to write data segments to a nearline storage system, according to certain embodiments.

FIG. 4 depicts an example of a process 400 performed by a computing node in a computing cluster of the distributed computing system shown in FIG. 1 to write data segments to a nearline storage system, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by components of the distributed computing system 110, such as by a computing node 136 comprised in a first computing cluster 122 of the distributed computing system 110.

At block 402, the computing node receives a query for execution. For example, in FIG. 1, a computing node 136 in the computing cluster 122 may receive a query for execution from a master node 132. At block 404, the computing node determines if one or more data segments required for executing the query are stored in the cache (e.g., 142) of the computing node.

If the segments are stored in the cache of the computing node, at block 406, the computing node executes the query using the data segment. At block 408, the computing node obtains one or more updated data segments as a result of executing the query. At block 410, the computing node writes the updated data segments to the nearline storage system.

In certain examples, at block 404, if the computing node determines that the data segments required for executing the query are not stored in the cache (e.g., 142) of the computing node or in secondary storage attached to the computing node or on the nearline storage layer, at block 412, the computing node obtains the data segments from the object storage system. In certain aspects, upon obtaining the data segments required for query execution, the computing node may perform the processing depicted in blocks 406-410 to execute the query using the obtained data segments, obtain updated data segments as a result of executing the query and write the updated data segments to the nearline storage system. In certain examples, upon obtaining the data segments required for query execution from the object storage system, the computing node may also, optionally, write these data segments to the nearline storage system 414 so that these data segments are available by the computing node for query processing thus accelerating query processing times during query execution by the computing node.

Figure 5:
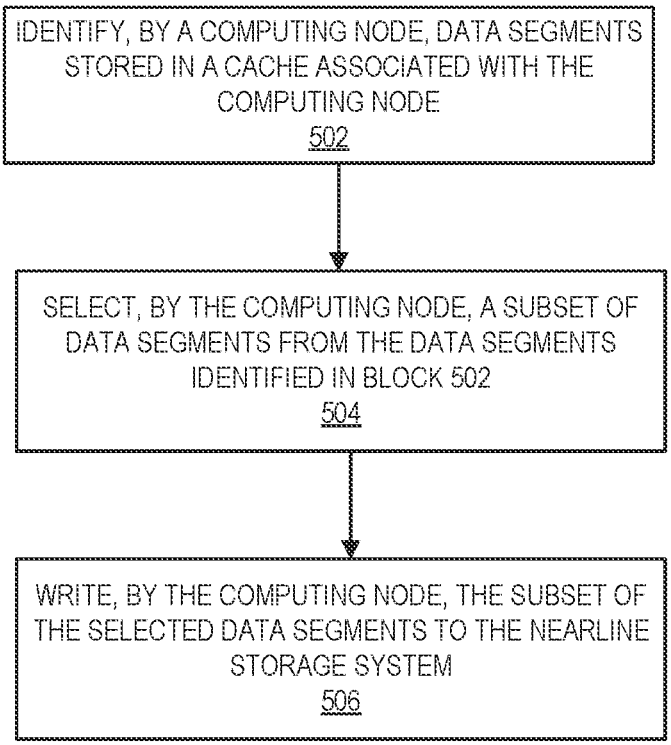
FIG. 5 depicts an example of a process performed by a computing node in a computing cluster of the distributed computing system shown in FIG. 1 to write data segments to a nearline storage system, according to certain embodiments.

FIG. 5 depicts an example of a process 500 performed by a computing node in a computing cluster of the distributed computing system shown in FIG. 1 to write data segments to a nearline storage system, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by components of the distributed computing system 110, such as by a computing node 136 comprised in a first computing cluster 122 of the distributed computing system 110.

At block 502, the computing node identifies data segments stored in its cache. For example, in FIG. 1, a computing node 136 in the computing cluster 122 may be configured to identify data segments that have already been fetched into its local cache (e.g., cache memory 138) during query execution. At block 504, the computing node selects a subset of these segments as candidate segments to be moved to the nearline storage cache tier 204 in the cache 138. The computing node may utilize a variety of approaches to select the subset of segments as part of the processing performed in block 504. These subset of segments may comprise segments that are being actively used by the computing node such as the most recently updated segments, the most frequently accessed segments and so on. By way of example, the computing node may utilize a least recently used (LRU) selection technique or a least frequently used (LFU) selection technique to select the subset of segments. At block 506, the computing node writes the selected subset of data segments to the nearline storage system.

The distributed computing system described in the present disclosure provides several technical advancements and/or improvements over conventional distributed computing systems provided by cloud-based data processing services. The distributed computing system leverages a nearline storage layer to accelerate query processing by the computing nodes of a computing cluster. As data in the cache of the computing nodes undergo churn and eviction, the computing nodes can probe the nearline storage layer for data availability prior to fetching the data from object storage, thereby optimizing and/or accelerating query processing and query execution against data of any size processed by the distributed computing system.

The distributed computing system additionally leverages the nearline storage layer to minimize the downtime required for bootstrapping a new computing cluster in the distributed computing system. Using a nearline storage system to bootstrap (i.e., pre-populate) a cache associated with computing nodes of a new/target computing cluster reduces cache warming times for the target/new cluster that is being provisioned in the distributed computing system. Cache warming times are reduced because the computing nodes of the target cluster can build their cache by probing an intermediate nearline storage layer for the presence of cached data instead of having to fetch the data from a slower and more expensive object storage system.

Example Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
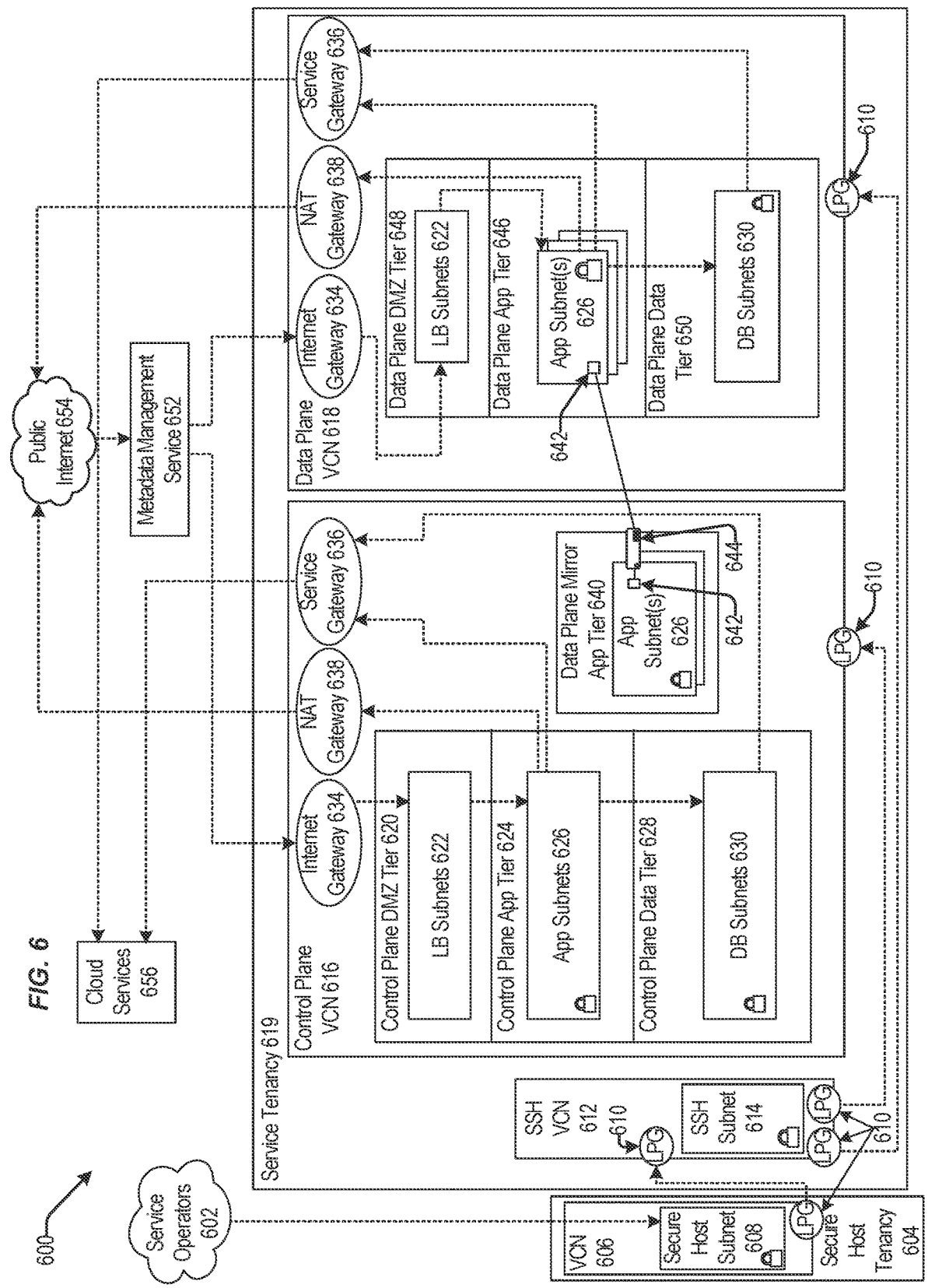
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
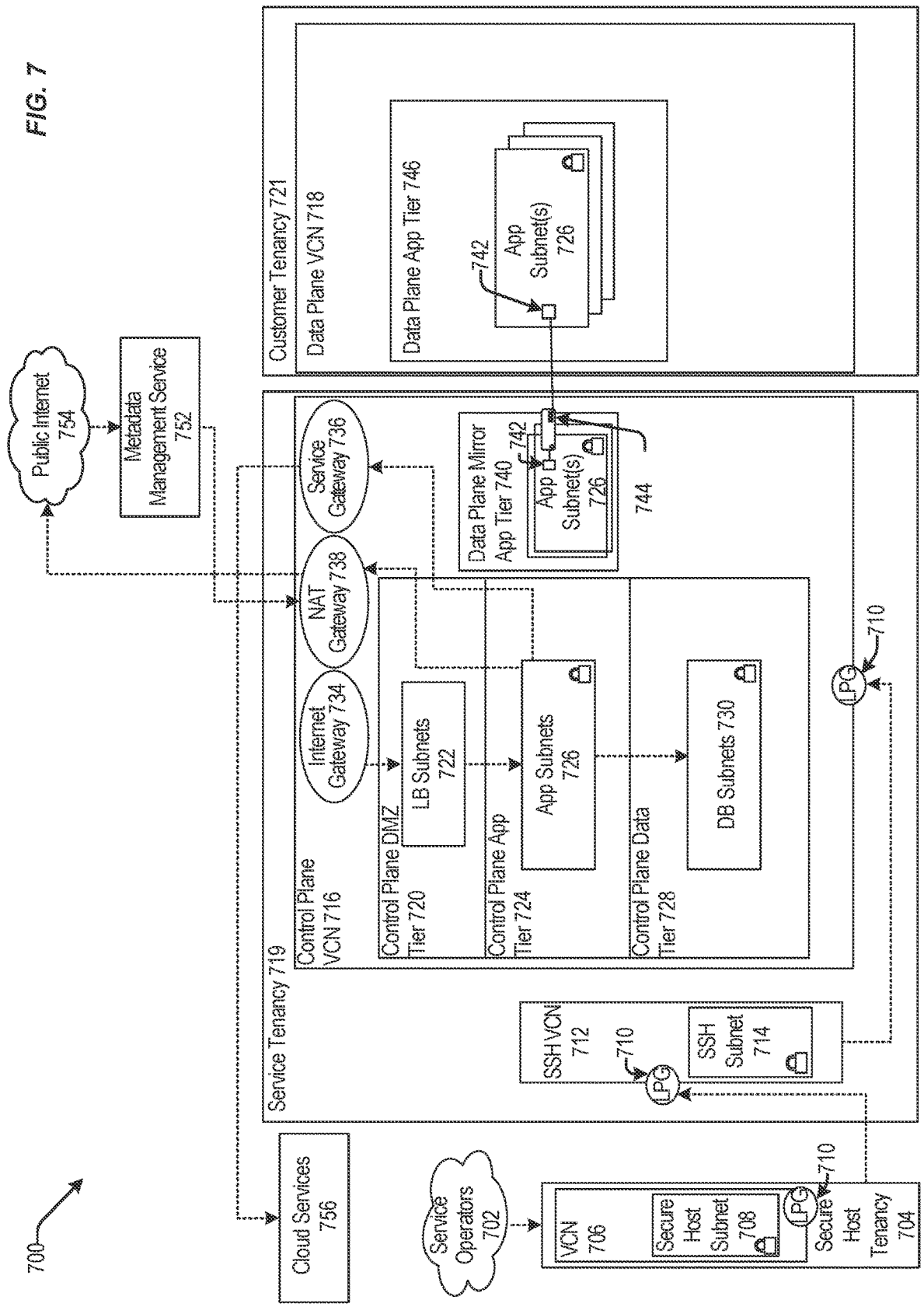
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may to be transmitted Deployment 6 in Region 1. In this example, the control plane VCN 716, or Deployment 6 in Region 1, may not be communicatively coupled to, or otherwise in communication with, Deployment 6 in Region 2.

Figure 8:
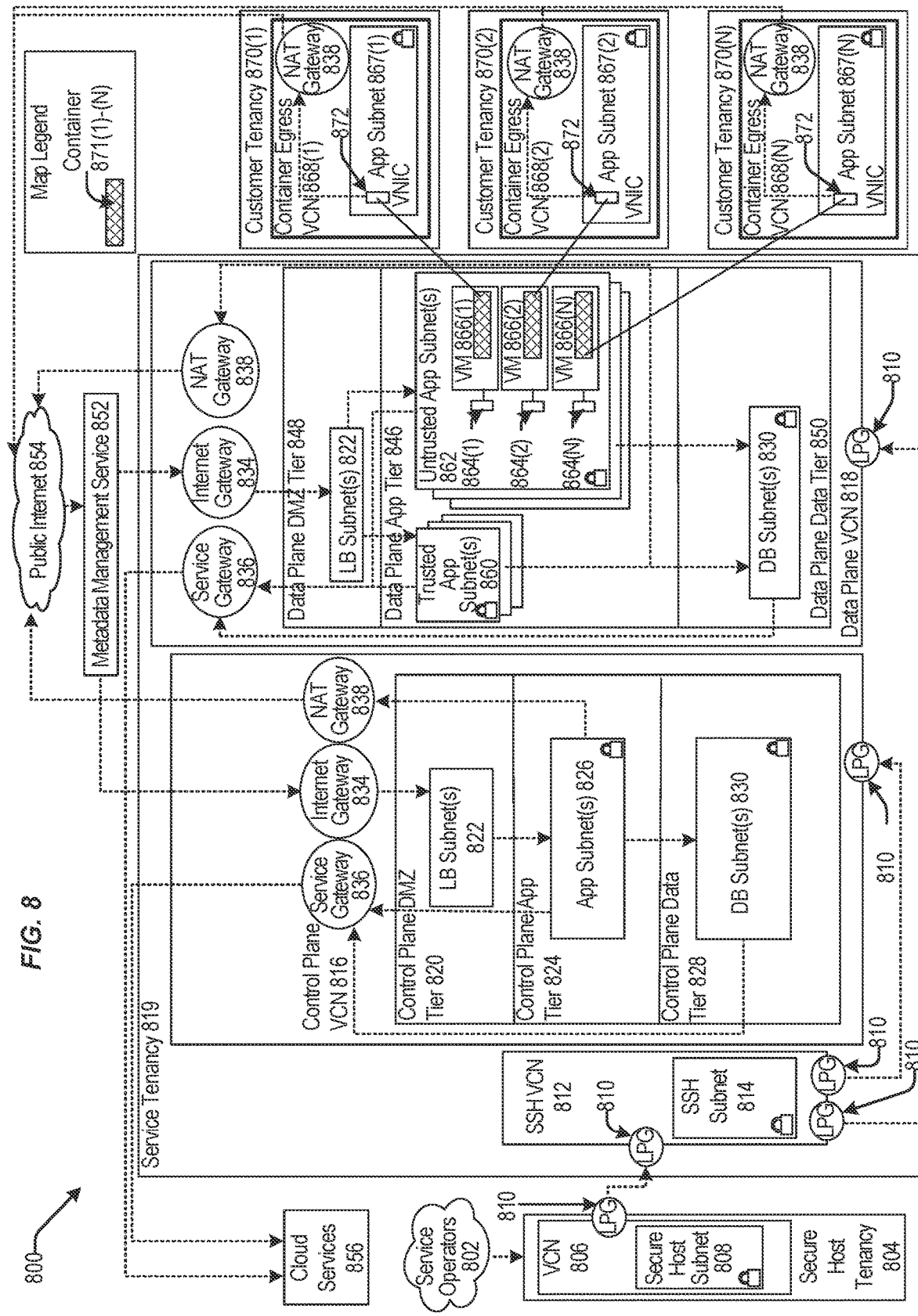
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
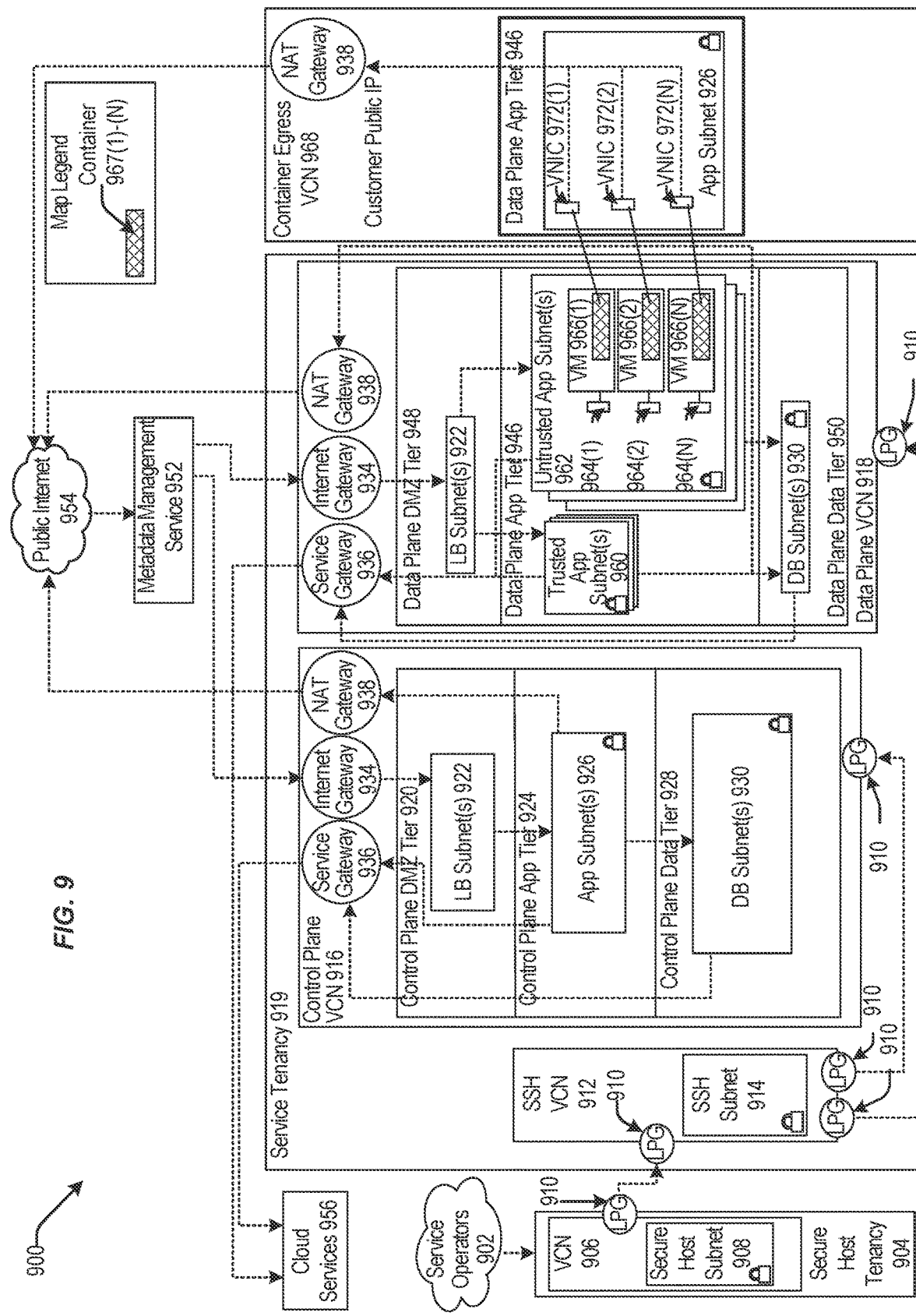
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
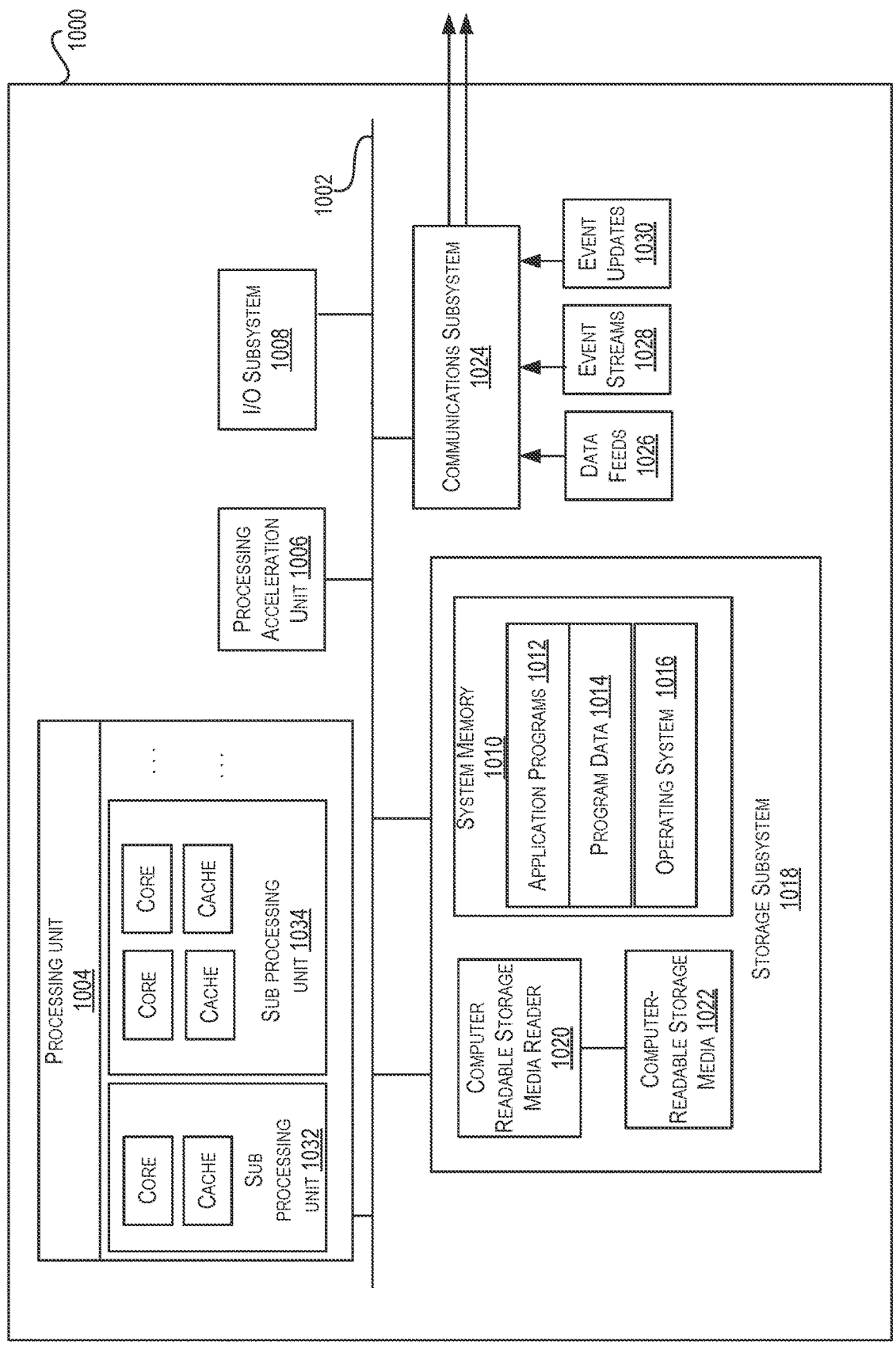
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage sub system 1018, and a communications sub system 1024. Storage sub system 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   executing, by a distributed computing system providing a data processing service, a first computing cluster comprising a first set of one or more computing nodes;
   identifying, by a computing node in the first set of one or more computing nodes of the distributed computing system, a plurality of data segments stored in a cache associated with the computing node, the cache comprising a set of one or more cache memory tiers;

selecting, by the computing node in the first set of one or more computing nodes of the distributed computing system, a set of one or more data segments from the plurality of data segments to be moved to a nearline storage cache tier, the set of one or more cache memory tiers comprising the nearline storage cache tier;

determining, by the distributed computing system, a subset of one or more data segments from the set of one or more data segments to be moved to a nearline storage system associated with the distributed computing system;

based at least in part upon the determining, writing, by the computing node in the first set of one or more computing nodes of the distributed computing system, the subset of one or more data segments to the nearline storage system;

receiving, by the distributed computing system, a request to create a second computing cluster in the distributed computing system, the second computing cluster comprising a second set of one or more computing nodes; and responsive to the request, bootstrapping, by the distributed computing system, the second computing cluster using the subset of one or more data segments stored in the nearline storage system.

2. The method of claim 1, wherein the request to create the second computing cluster is received responsive to at least one of a cluster upgrade, a cluster migration, or a cluster failover associated with the first computing cluster.

3. The method of claim 1, wherein bootstrapping, by the distributed computing system, the second computing cluster comprises:

obtaining, by one or more computing nodes in the second set of computing nodes comprising the second computing cluster, the subset of one or more data segments stored in the nearline storage system; and pre-populating, by the one or more computing nodes, a cache associated with the one or more computing nodes in the second set of computing nodes with the subset of one or more data segments.

4. The method of claim 3, wherein the nearline storage system represents an intermediary storage layer between the cache associated with the one or more computing nodes in the second set of computing nodes and an object storage system associated with the distributed computing system.

5. The method of claim 1, further comprising wherein:

receiving, by the computing node in the first set of computing nodes comprising the first computing cluster, a query for execution;

determining, by the computing node, that one or more data segments for executing the query are present in the cache associated with the computing node;

executing, by the computing node, the query using the one or more data segments;

obtaining, by the computing node, one or more updated data segments as a result of executing the query; and writing, by the computing node, the one or more updated data segments to the nearline storage system associated with the distributed computing system.

6. The method of claim 1, further comprising receiving, by the computing node in the first set of computing nodes comprising the first computing cluster, a query for execution;

determining, by the computing node, that one or more data segments for executing the query are not present in the cache associated with the computing node;

responsive to determining that the one or more data segments are not present in the cache, obtaining, by the computing node, the one or more data segments from an object storage system associated with the distributed computing system; and writing, by the computing node, the one or more data segments to the nearline storage system associated with the distributed computing system.

7. The method of claim 1, wherein selecting, by the computing node, the set of one or more data segments from the plurality of data segments is performed using a selection technique, wherein the selection technique comprises at least one of a least recently used (LRU) selection technique or a least frequently used (LFU) selection technique.

8. The method of claim 1, wherein the set of one or more cache memory tiers comprises an object storage cache tier.

9. The method of claim 8, wherein the object storage cache tier is mapped to an object storage system associated with the distributed computing system, wherein the object storage cache tier is configured to temporarily store the plurality of data segments for the object storage system.

10. The method of claim 1, wherein the nearline storage cache tier is mapped to a nearline storage system associated with the distributed computing system, wherein the nearline storage cache tier is configured to temporarily store the set of one or more data segments for the nearline storage system.

11. The method of claim 1, wherein the first computing cluster and the second computing cluster are associated with a first tenant of the distributed computing system.

12. A distributed computing system providing a data processing service comprising:

a memory; and one or more processors configured to perform processing, the processing comprising:

executing, by the distributed computing system, a first computing cluster comprising a first set of one or more computing nodes;

identifying, by a computing node in the first set of one or more computing nodes of the distributed computing system, a plurality of data segments stored in a cache associated with the computing node, the cache comprising a set of one or more cache memory tiers;

selecting, by the computing node in the first set of one or more computing nodes of the distributed computing system, a set of one or more data segments from the plurality of data segments to be moved to a nearline storage cache tier, the set of one or more cache memory tiers comprising the nearline storage cache tier;

determining, by the distributed computing system, a subset of one or more data segments from the set of one or more data segments to be moved to a nearline storage system associated with the distributed computing system;

based at least in part upon the determining, writing, by the computing node in the first set of one or more computing nodes of the distributed computing system, the subset of one or more data segments to the nearline storage system;

receiving, by the distributed computing system, a request to create a second computing cluster in the distributed computing system, the second computing cluster comprising a second set of one or more computing nodes; and responsive to the request, bootstrapping, by the distributed computing system, the second computing cluster using the subset of one or more data segments stored in the nearline storage system.

13. The system of claim 12, wherein the request to create the second computing cluster is received responsive to at least one of a cluster upgrade, a cluster migration, or a cluster failover associated with the first computing cluster.

14. The system of claim 12, wherein bootstrapping, by the distributed computing system, the second computing cluster comprises:
   obtaining, by one or more computing nodes in the second set of computing nodes comprising the second computing cluster, the subset of one or more data segments stored in the nearline storage system; and
   pre-populating, by the one or more computing nodes, a cache associated with the one or more computing nodes in the second set of computing nodes with the subset of one or more data segments.

15. A non-transitory computer-readable medium having program code that is stored thereon, the program code executable by one or more processing devices for performing operations comprising:
   executing, by a distributed computing system, a first computing cluster comprising a first set of one or more computing nodes;
   identifying, by a computing node in the first set of one or more computing nodes of the distributed computing system, a plurality of data segments stored in a cache associated with the computing node, the cache comprising a set of one or more cache memory tiers;
   selecting, by the computing node in the first set of one or more computing nodes of the distributed computing system, a set of one or more data segments from the plurality of data segments to be moved to a nearline storage cache tier, the set of one or more cache memory tiers comprising the nearline storage cache tier;
   determining, by the distributed computing system, a subset of one or more data segments from the set of one or more data segments to be moved to a nearline storage system associated with the distributed computing system;
   based at least in part upon the determining, writing, by the computing node in the first set of one or more computing nodes of the distributed computing system, the subset of one or more data segments to the nearline storage system;
   receiving a request to create a second computing cluster in the distributed computing system, the second computing cluster comprising a second set of one or more computing nodes; and
   responsive to the request, bootstrapping the second computing cluster using the subset of one or more data segments stored in the nearline storage system.

16. The non-transitory computer-readable medium of claim 15, further comprising:
   receiving, by the computing node in a first set of computing nodes comprising a first computing cluster, a query for execution;
   determining, by the computing node, that one or more data segments for executing the query are present in the cache associated with the computing node;
   executing, by the computing node, the query using the one or more data segments;
   obtaining, by the computing node, one or more updated data segments as a result of executing the query; and
   writing, by the computing node, the one or more updated data segments to the nearline storage system associated with the distributed computing system.

* * * * *

UNITED STATES PATENT AND TRADEMARK OFFICE
CERTIFICATE OF CORRECTION

PATENT NO. : 11,966,754 B2
APPLICATION NO. : 17/869666
DATED : April 23, 2024
INVENTOR(S) : Deokule et al.

It is certified that error appears in the above-identified patent and that said Letters Patent is hereby corrected as shown below:

In the Specification

In Column 21, Line 9, delete "to be transmitted" and insert -- be transmitted to --, therefor.

In Column 25, Line 35, delete "sub system" and insert -- subsystem --, therefor.

In Column 25, Lines 35-36, delete "sub system" and insert -- subsystem --, therefor.

In Column 25, Line 36, delete "sub system" and insert -- subsystem --, therefor.

In the Claims

In Column 31, Line 47, in Claim 5, delete "comprising wherein:" and insert -- comprising: --, therefor.

In Column 31, Line 61, in Claim 6, delete "comprising" and insert -- comprising: --, therefor.

Signed and Sealed this
Sixth Day of August, 2024

Katherine Kelly Vidal
*Director of the United States Patent and Trademark Office*